July 15, 1947.  H. C. HAYES  2,424,030
BALANCED DRIVER FOR SONIC DEPTH FINDERS
Filed Jan. 30, 1932  4 Sheets-Sheet 1
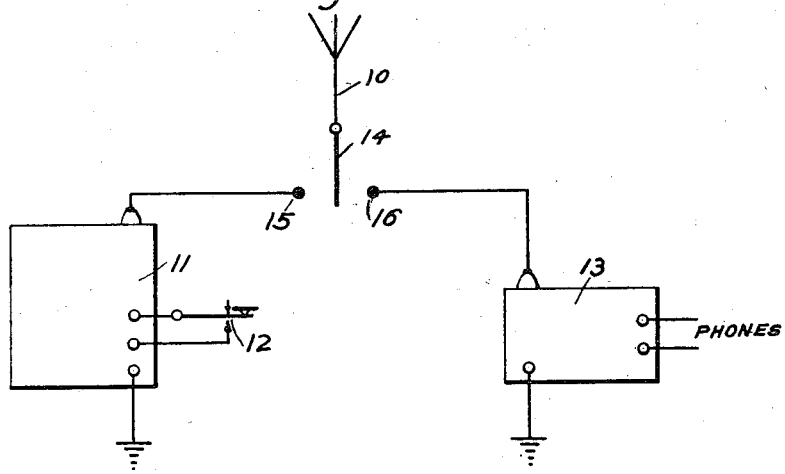
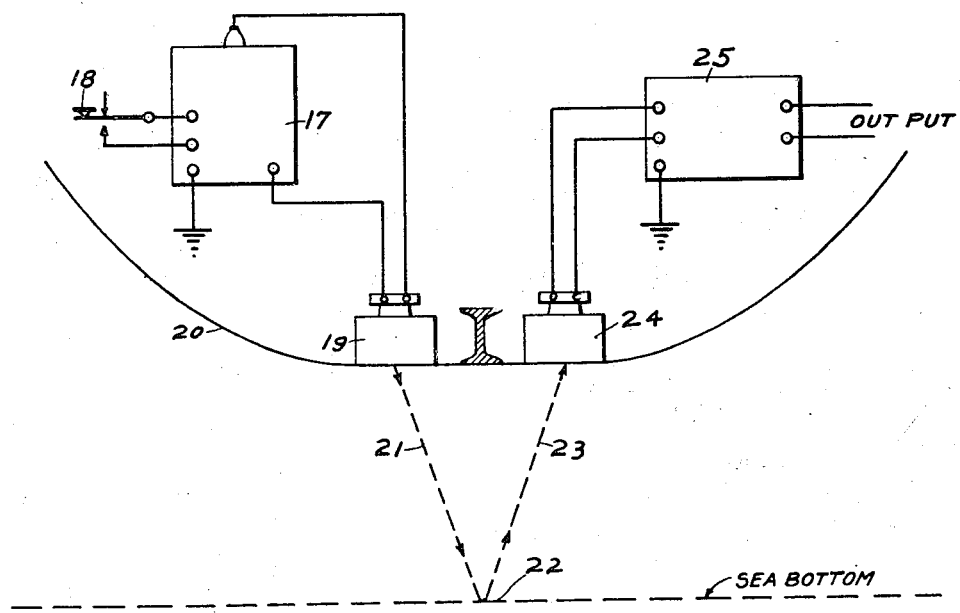
INVENTOR
Harvey C. Hayes
BY
ATTORNEY July 15, 1947.    H. C. HAYES    2,424,030
BALANCED DRIVER FOR SONIC DEPTH FINDERS
Filed Jan. 30, 1932    4 Sheets-Sheet 3

INVENTOR
Harvey C. Hayes
BY
ATTORNEY

July 15, 1947. H. C. HAYES 2,424,030
BALANCED DRIVER FOR SONIC DEPTH FINDERS
Filed Jan. 30, 1932 4 Sheets-Sheet 4

INVENTOR
Harvey C. Hayes
BY
ATTORNEY

Patented July 15, 1947

2,424,030

UNITED STATES PATENT OFFICE 2,424,030

BALANCED DRIVER FOR SONIC DEPTH FINDERS

Harvey C. Hayes, Washington, D. C.,

Application January 30, 1932, Serial No. 589,946

5 Claims. (Cl. 177—386)

(Granted under the act of March 3, 1883, as amended April 30, 1928; 370 O. G. 757)

This invention relates to apparatus for sound ranging wherein the transmitter and receiver are combined into a single instrument.

Among the objects of my invention are: to cheapen the cost by elimination of parts heretofore used, to eliminate undependable relays, to employ substantially perpendicular reflection of the signal and so enhance the accuracy of the results in shallow sounding, and to provide a balanced driver whereby the same parts may be used for simultaneously sending and receiving of signals. Other objects will appear hereinafter in the disclosure.

With the above and other objects in view, the invention consists in the construction, combination and arrangement of parts as will be hereinafter more fully described.

Reference is to be had to the accompanying drawings forming a part of this specification in which like reference characters indicate corresponding parts throughout the several views and in which Fig. 1 shows schematically the heretofore used apparatus where a single device (the antenna) is used for both sending and receiving signals;

Fig. 2 shows schematically the usual form of sonic depth finding apparatus;

Figure 3:
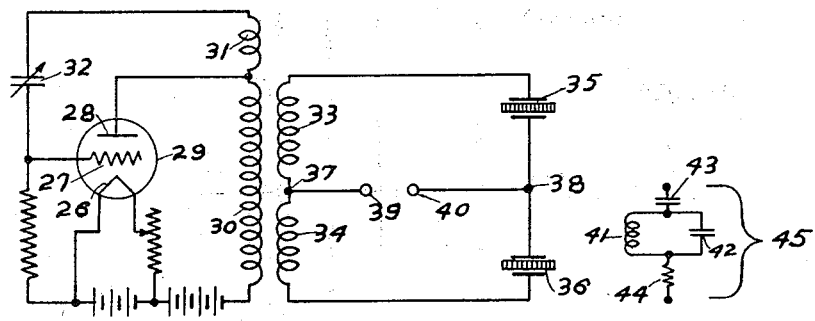
Fig. 3 illustrates the principle of the balanced driver involved in the present invention.

Hereinafter the part which functions as both transmitter and receiver will be termed a transceiver.

The distinctive advantages of my invention can best be made clear by pointing out wherein it differs from previously known devices used for the same purpose, and to that end the essential features of such devices will be set forth.

In Fig. 1 the antenna 10 serves both to transmit signals from the transmitter 11 controlled by means of key 12, and to intercept signals from other stations and transfer the same to receiver 13. Switch 14 may be thrown to contact 15 to connect the transmitter 11 to antenna 10 for sending, or to contact 16 for receiving, signals by the antenna. In practice, the switch 14 is usually operated by a relay that permits an operator receiving signals sent out by antenna 10 to interrupt to ask for repetitions. The last mentioned mode of operation of the switch is termed a "break-in" system and is satisfactory for radio intercommunication where time measurements are not involved.

However, in sound ranging the determinations depend upon accurate measurement of the time interval elapsing between the signal and the receipt of the echo thereof, and here the time lag, and especially the variation of time lag, of the break-in relay introduces serious errors. Where the distance from the keel of a ship to the reflecting bottom of the water is so small that the time of sound travel to and from the bottom is less than the time lag of the relay, a system depending upon the action of a relay is of no avail in sounding. For example, if the depth of water below the keel is one fathom, the time required for the echo to return from the bottom is one four-hundredth of a second, which is much less than the time lag of a relay, and so for shoal sounding the receiver must be connected to pick up the echoes continuously, and this in previously known systems has required a separate receiver.

A sound ranging installation of the type mentioned is shown diagrammatically in Fig. 2, wherein the driver 17, controlled by key 18, actuates a diaphragm in the electro-mechanical vibratory transmitter 19 that is set into the skin 20 of the ship to place the diaphragm in contact with the water. Sound waves sent out by the diaphragm follow the path 21 to the bottom 22, whence the echo is reflected along path 23 to the diaphragm in an electro-mechanical vibratory receiver 24 where the mechanical vibrations of the diaphragm due to the impinging sound waves impress corresponding fluctuations upon an electric current, or generate a fluctuating electric current, that is amplified in the receiver amplifier 25. With this apparatus, it is necessary to pierce the skin of the ship in two places, and to use two electro-mechanical vibratory devices.

My invention has primarily to do with the driver employed for energizing the transmitter but, as will be seen, its full advantage for certain purposes results from a combination of the improved driver with other parts of the installation. The improvement in the driver results from an arrangement of parts and circuits whereby the throw-over or break-in system is not required because the transceiver is permanently connected to both the driver and the receiver amplifier. Such connection is made possible by a bridge arrangement that permits the receiver amplifier to be connected in a neutral or balanced arm so far as the powerful electrical oscillations employed for transmission are concerned, but which is not balanced or neutral as regards the small electromotive forces which the received sound waves generate in the transceiver.

The principle of operation of my balanced driver is shown in Fig. 3, wherein the numerals 26, 27 and 28 designate the filament, grid and plate, respectively, of a power tube 29, connected regeneratively to oscillate and serve as a source of alternating current. Coil 30 in the plate circuit induces an E. M. F. in coil 31 that feeds through variable condenser 32 to grid 27 to maintain the tube in an oscillating condition in accordance with standard practice. In place of the tube 29 any suitable source of alternating current may be employed. A secondary circuit is inductively coupled to the plate circuit of tube 29 by the identical coils 33 and 34, the complete circuit consisting of the coils and the two like transceivers 35 and 36, all in series. The transceivers are indicated as being made up of properly oriented piezo-electric crystals cemented between steel disks, this being the form at present preferred.

It follows from the symmetry of the secondary circuit that if, through the inductive coupling to coil 30, the same E. M. F. is induced in both of coils 33 and 34 and in the same sense—i. e., at any instant both coils urge the current of the secondary circuit in the same direction—then at all times the potential difference between the mid-points 37 and 38 will be zero so far as current fluctuations in coil 30 are concerned, and the receiver amplifier may with safety be permanently connected between terminals 39 and 40 without danger of injury by the heavy currents and voltages supplied to the two transceivers.

However, if sound waves strike one of the transceivers, say 35, the electromotive forces thereby generated are not balanced across terminals 39 and 40, but will be equal to the total E. M. F. generated by the transceiver less the potential drop through the transceiver and coil 33. In practice the electromotive force actually impressed upon an amplifier connected across terminals 39 and 40 is about one-half of the total generated by the transceiver.

In the application of the principle just set forth, two like transceivers are not employed, but one of them, say 36, is replaced by its electrical equivalent which is a combination of inductance, capacity, and resistance so arranged and of such values as to offer exactly the same impedance as does the transceiver. These values can be determined experimentally. In the case of the piezo-electric transceiver herein disclosed, the electrical equivalent is an inductance 41 and capacity 42 connected in parallel and this combination connected in series with a capacity 43 and pure resistance 44, the equivalent circuits being designated as a unit by 45.

Figure 4:
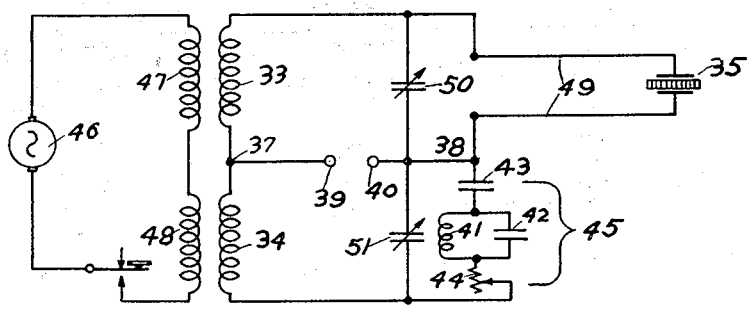
Fig. 4 shows a generalized embodiment of my invention.
Figure 5:
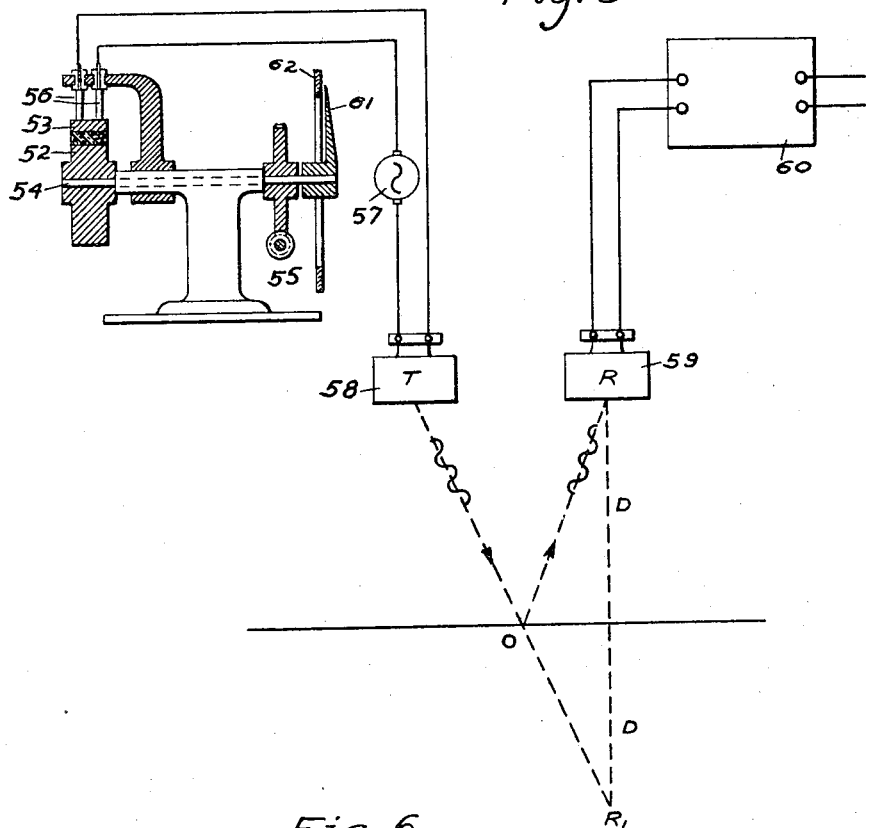
Fig. 5 shows the usual depth finder of the type mentioned, partly in detail and in part schematically.
Figure 6:
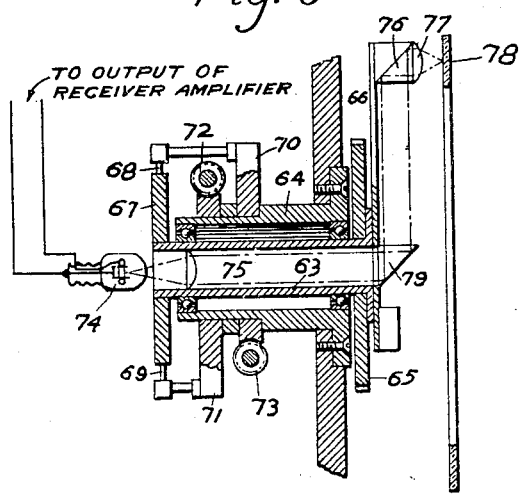
Fig. 6 illustrates my modification of the part shown in detail in Fig. 5.

Fig. 4 shows schematically an embodiment of the driver and transmitter as installed in practice. A source of alternating current 46 is adjustable to produce a current of the same frequency as the natural frequency of the sound generator 35. The primary circuit, comprising coils 47 and 48 is inductively coupled to coils 33 and 34 so that the coupling between 47 and 33 is equal and identical to that between coils 48 and 34, and so sensed that the electromotive forces generated in coils 33 and 34 operate in the same direction about the secondary circuit. Cable leads 49 connect transceiver 35 to the secondary circuit. Transceiver 35 and its electrical equivalent 45 are shunted by the variable capacities 50 and 51, respectively, whereby the two branches of the secondary circuit can be made equal to one another as required for efficiency. As no current flows between terminals 39 and 40 when connected together while the system is properly adjusted the balance of the parts may be ascertained by a current measuring instrument connected thereto. A relatively insensitive ammeter may be connected thereto to effect the rough adjustment and this replaced by a sensitive instrument to make the fine adjustment. If necessary, the setting of the parts may be completed by listening with phones connected to the amplifier after the amplifier has been connected thereto, but this is ordinarily not required. The adjustments are made by means of variable capacities 50 and 51 and variable resistance 44. From the foregoing it is apparent that my invention provides a method and means whereby a single transceiver may be employed for both transmission and reception without the use of a break-in system with its attendant relay time lag and variation of time lag dependent upon the condition of adjustment, power input, etc.

My balanced driver offers an additional advantage in that it permits of balancing out separately the capacity, inductance and resistance of the transceiver, thereby making it possible to determine a change in the value of any one of these factors by noting the change in the corresponding balancing factor. The capacity and inductance of the transceiver branch are substantially independent of the frequency of the current but the effective resistance is not, because the energy radiated into the medium affects the circuit the same as an added resistance giving an ($I^2R$) loss equal to the radiation. This loss will be greatest when the frequency of the electric current is equal to the resonant frequency of the transceiver because at this frequency the transceiver generates the maximum sound energy in the medium. The balanced driver, therefore, enables the operator to adjust the current frequency to the value that gives the maximum sound output by tuning to the frequency that requires the maximum value of resistance on the rheostat 44 for balanced adjustment. Moreover, the difference in the value of the resistance for tuned and untuned adjustment is a rough measure of the radiation.

In the art of intercommunication by radio or sound the chief value of the balanced driver using but one transceiver for both transmission and reception of wave energy lies in its simplicity, since the elimination of the time lag of a relay is there of no particular moment, the time factor not being involved. However, in sound ranging, where the range is determined as the product of the velocity of sound and the time of sound transit, a small error in determining the time factor results in a relatively large error in the range because of the large value of the velocity factor. In the case of submarine sound ranging where the velocity is about 4800 feet per second, an error of a hundredth of a second produces an error of nearly 50 feet in the range. This would not be serious where the depth is great, but in relatively shoal water such an error might well be disastrous. In depth ranging the time factor must be measured to within something like a thousandth of a second and it is obvious that it cannot be done dependably if the measurement involves the erratic time lag of a relay. Even if the time lag were constant, its value would be greater than the time interval involved in sounding depths as shallow as one fathom below the keel, and as a result the echo would have returned before the relay-operated transfer switch could change the connection over from the transmitter to the receiver amplifier, and it has therefore been necessary heretofore to use a separate transmitter and receiver, as shown in Fig. 2. It is therefore apparent that the chief value of my invention lies in its application to sound ranging.

The great value of my invention lies in the accurate measurement of the time required for a sound signal to travel from the transceiver to a distant reflecting surface and back again. The method of indicating that time interval heretofore in use will be briefly described to make more clear the advance in the art brought about by the invention of my device.

Most of the prior systems use a commutator 52 having an insulated conducting segment 53 on its periphery and mounted on a shaft 54 that is driven slowly at a constant predetermined speed through speed reduction gear 55 by a motor (not shown). When brushes 56 contact segment 53 the circuit through a source 57 of alternating current and transmitter 58 is closed and a sound signal is sent out once each revolution of commutator 52, strikes the bottom at 0 and is reflected to receiver 59, whence it is conducted to amplifier 60. The sending apparatus described is simply an automatic key that controls the transmission of signals at equally spaced time intervals.

A pointer 61 is mounted on shaft 54 to rotate therewith, and adjacent thereto is an annular scale 62. The distance the sound travels from transmitter to receiver will be proportional to the angular distance swept over by the pointer during the interval between the transmission and the receipt of a signal. If, therefore, scale 62 is properly calibrated and pointer 61 is mounted to pass the zero point on scale 62 at the instant the signal is sent, the position of the pointer with respect to the scale at the time the signal echo is received indicates the range. This range indicator mechanism is essentially the same in all systems, though the specific details thereof may vary.

The brushes 56 may be connected directly into the power circuit of the driver 57, but more often they actuate a relay that opens and closes the driver circuit, the relay being provided with heavy contact points to carry the rather large current required by the transmitter. Due to relatively rapid wear of the points of the relay and of the brushes and commutator segment by arcing the time interval between signals does not remain constant, and the power delivered to the transmitter changes from time to time because of variations in resistance at the contact of the brushes with the commutator.

The energy generated in the receiver by the echo waves is increased by a vacuum tube amplifier to the point that it will cause a sound in a loud speaker or head phones, operate a relay, flash a lamp, or give a spark across a short air gap. In some apparatus of this type it serves to flash a neon lamp carried on the end of pointer 61, and in others to pass a spark from the tip of the pointer to the metal ring that carries scale 62 or to make a visible signal of some other kind. The purpose of all of them is to indicate visually the angle through which the pointer has passed during the interval from the sending of the signal impulse to the receiving of the echo thereof.

Figure 7:
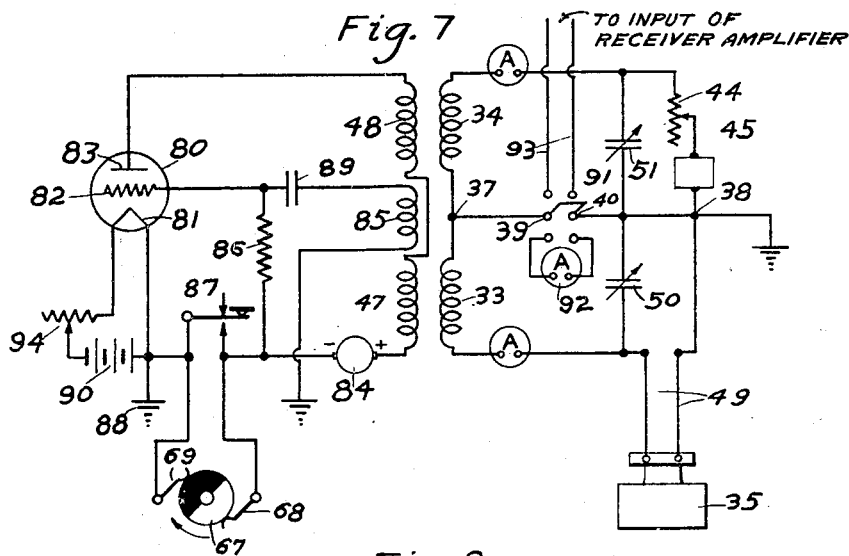
Fig. 7 shows diagrammatically the relations of the several parts of the transmitting mechanism of my invention.

The range indicator of my invention has a hollow shaft 63 mounted in anti-friction bearings in stationary member 64 to be driven at constant speed by power applied to gear 65 on the shaft. A counterbalanced arm 66 is secured to one end of shaft 63 and a commutator 67 to the other end thereof, with brushes 68 and 69 contacting the commutator. The brushes are carried on arms 70 and 71 that are angularly adjustable by means of tangent screws 72 and 73, respectively. One-half of the peripheral surface of commutator 67 is conductive, and the other half is of insulating material, as indicated in Fig. 7, whereby the circuit is closed through the brushes 68 and 69 when both brushes are in contact with the conducting portion of the commutator simultaneously. By means of the screws 72 and 73 the circuit may be closed at any desired angular position of the shaft and the length of the time while both brushes are on the conducting portion may be adjusted and thus control the duration of the signal.

A neon lamp 74 that is connected to the output of the receiver amplifier is disposed on the axis of shaft 63. When a sound wave impinges upon the diaphragm of the receiver a current is generated in the receiver and this current, after amplification, flashes lamp 74 to indicate the receipt of the echo. The light from lamp 74 passes through collimating lens 75 and shaft 63 to the reflecting prism 79 at the other end of shaft 63, whence it is reflected to a second prism 76 on arm 66, and by a lens 77 the light from the second prism is focused on a ground glass scale 78. Arm 66 passes the zero point on scale 78 at the instant the signal is sent out and therefore the point on the scale upon which the light from lens 77 is focused gives the distance to the reflecting surface. The brushes 68 and 69 are connected to the driver (not shown) and, in connection with the commutator, serve as an automatic key to send out signals at uniform intervals of time.

The driver circuits are shown diagrammatically in Fig. 7. The power tube 80 has a filament 81, grid 82, and plate 83. Identical coils 47 and 48 in the plate circuit are in series with each other and with the direct current generator 84 that supplies the plate voltage. Connected to the grid are condenser 89 and coil 85 inductively coupled with coils 47 and 48 to have regenerative action and cause tube 80 to oscillate. Resistance 86 is connected to grid 82 and to the negative lead of generator 84 to determine the grid bias of the tube, and normally allows the grid potential to rise and block the action of the tube, but when the circuit is closed through either hand operated key 87 or commutator 67 the grid charge leaks across to ground 88, the grid becomes less negative, and permits the plate current to flow. The current to heat the filament cathode 81 is supplied by battery 90 and is controlled by variable resistance 94.

The secondary circuit of the driver includes the identical coils 33 and 34 inductively coupled with coils 47 and 48, respectively, and so sensed that the current from both tends to flow in the same direction around the circuit through transceiver 35 and its electrical equivalent 45. Mid-points 37 and 38 of the balanced secondary circuit are respectively connected to terminals 39 and 40 which are connected to the poles of a double-pole double-throw switch 91. Switch 91 may be thrown to connect ammeter 92 to terminals 39 and 40 while the circuit is being balanced and then to the input leads 93 of the receiver amplifier. Condensers 50 and 51 serve to tune the two branches of the secondary circuit to the resonant frequency of transceiver 35.

The procedure of adjusting the two branches of the secondary circuit for balance across the terminals 39 and 40 is as follows: Condensers 50 and 51 are set to give equal readings on ammeters 93 and 94, which gives a rough balance sufficient to protect ammeter 92 that is then connected to the neutral branch of the secondary net by means of switch 91; condensers 50 and 51 and resistance 44 are then adjusted until ammeter 92 indicates no current flowing through the neutral branch due to the action of coils 33 and 34; switch 91 is then thrown to connect the amplifier to terminals 39 and 40 and the output of the amplifier is listened to by phones and condensers 50 and 51 and resistance 44 are adjusted to the positions of minimum sound.

Usually, however, the final adjustment mentioned is not made. In fact, the balance of the secondary circuit is deliberately disturbed to the point where the amplifier will receive enough pick-up across terminals 39 and 40 to flash lamp 4 when the circuit is closed to send out a signal, which flash should fall upon the zero point on scale 78. If the flash does not occur at the zero point, the brushes may be adjusted on the commutator to make it so occur, and the flash caused by the received echo will indicate on the scale the depth of the reflecting surface. This adjustability of the zero point while the device is in operation, without disturbing any other setting is one of the advantageous features of my invention. By means of the transmission flash the adjustment may be checked at any time, and so avoid errors due to misadjustment arising during the use of the apparatus. If the transmission flash and the reception flash overlap due to nearness of the reflecting surface to the transceiver, the brushes can be adjusted to shorten the duration of the signal and thus separate the flashes.

Figure 8:
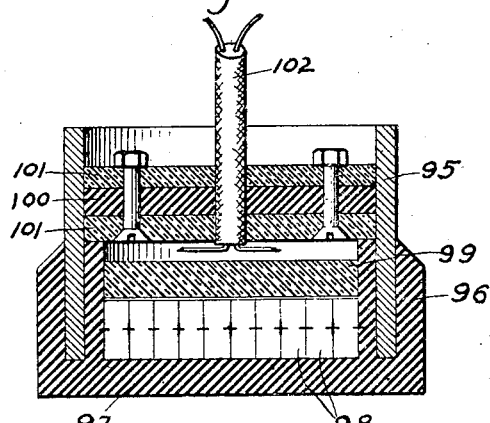
Fig. 8 is a cross sectional detail of the means employed to generate and receive the sound waves.

The construction of one type of transceiver is clearly disclosed in Fig. 8, which, due to its simplicity and low cost is very desirable. The cylindrical casing 95 has vulcanized thereto a rubber cap 96 that extends both interiorly over a portion of the casing and has a portion 97 that forms a diaphragm or sound window. Within the casing a pile of equal Rochelle salt crystals 98 are seated against the inside face of the diaphragm portion 97 of rubber cap 96 and so oriented that the active positive and negative electrodes of adjacent crystals are in contact, as indicated by the alternate positive and negative signs at their surfaces of separation. Inertia member 99 is cemented to the top of the pile of crystals, and plays an important part in determining the character of the standing wave system of sound waves in the transceiver. If a highly tuned transceiver is desired the thickness of the member 99 is made equal to an even number of half wave lengths of the sound emitted, but where sharp tuning is not required its thickness is made not more than a quarter wave length of the sound wave. A closure for the other end of the casing is formed of a rubber disk 100 clamped between plates 101, which disk, when strongly compressed, expands and makes a tight fit against the sides of the casing. An electrical cable 102 carries two wires, one of which is connected to all the positive electrodes of the crystals and the other to the negative electrodes, the combinations of the crystals in series, parallel, or series-parallel groups being such that the impedance of the transceiver is matched with the other units of the circuits in which it is connected.

As is well known in the art of sound generation and reception, a variation of electric potential across the crystals causes them to expand and contract in a direction perpendicular to the electric field, in the present instance this direction of expansion being perpendicular to the face of diaphragm 97. When so driven the oscillatory movement of the crystals makes of them a sound transmitter. On the other hand, when a sound wave impinges on diaphragm 97 the pressure thereby applied to the crystals 98 causes them to generate variable potentials of the same frequency and character as the sound waves; the device thereby serves as a receiver for sound waves. When mounted in operative position, the diaphragm 97 faces vertically downward through the skin of the ship in contact with the water. No means of so mounting the transceiver is shown, as it may have one of a great number of known forms adapted thereto.

Figure 9:
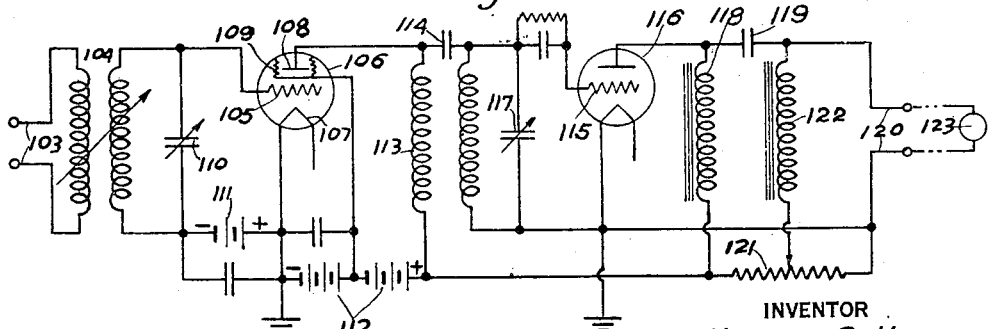
Fig. 9 is a diagram of the circuits of the receiver-amplifier of my invention.

A receiver amplifier that is preferred for its simplicity and ease of adjustment is shown schematically in Fig. 9. The input terminals, designated by 103, are inductively coupled through transformer 104 to the control grid 105 of screen grid tube 106 having a filament 107, a plate 108, and screen grid 109. Variable condenser 110 serves to tune the grid in accordance with general practice. Control grid 105 and screen grid 109 are properly biased by C battery 111 and a part of B battery 112, respectively. Radio frequency choke 113 passes the direct current component of the plate current but forces the alternating current component thereof to vary the potential of condenser 114, which in turn varies the potential of the grid 115 of detector tube 116, the input of grid 115 being tuned by variable condenser 117. Audio choke 118 in the detector tube plate circuit forces the potential fluctuations of this circuit across condenser 119 and thence across the output terminals 120.

High resistance 121 and choke 122 form an important part of the receiver amplifier in that they serve to place a direct current voltage of any desired value up to and even beyond the flash voltage across the neon lamp 123, the voltage across the lamp being at any instant equal to the biasing voltage plus that supplied across condenser 119 by the input to the amplifier. It will be seen that by raising the biasing voltage to any value below the flash point the amplification of the input voltage required to flash the lamp will be thereby reduced and fewer stages of amplification will be required. It is obvious that the choke 122 passes the direct current biasing current to the lamp terminals and at the same time prevents passage of the fluctuating voltages from the detector and directs them across the lamp.

In general a neon lamp, when once flashed, will continue to glow if the biasing voltage approaches very close to the flash value but by the combination of resistance 121 and choke 122 this is prevented because the impedance of the choke prevents any sudden current supply from the biasing voltage as does also the large resistance 121. It follows, therefore, that the major part of the energy expended by the lamp comes from the detector tube and as a result the biasing voltage may be raised near to the flash value without causing the flash to continue after the voltage supplied by the plate has ceased. In this way the sensitivity of the apparatus is made sufficiently high to sound the greater depths without resorting to troublesome and expensive multistage amplifiers.

From the foregoing, it will be readily apparent that my invention has, among others, the following distinct advantages over previous devices for the purposes to which this is adapted:

My device is less expensive in that but one electro-mechanical vibratory device is required for both transmitting and receiving and the hull work involved in installing it is decreased by one-half as the hull need be punctured in but one place.

When a different device is used for each of the transmitter and the receiver they must be separated a considerable distance and the receiver be well shielded from serious interference with the operation of the receiver by waves received directly (not reflected) from the transmitter. In making shoal soundings with the receiver and the transmitter relatively widely separated, the angle between the transmitted wave train and the reflected train becomes very obtuse, and the total distance travelled by the sound between the two parts of the apparatus is great as compared to the depth of the water below the keel, giving rise to serious errors in the result if there be any variations in the time factor, and the magnitude of the error increases the shallower the water— just where accuracy is most vital. This can not occur with my invention using a transceiver, as there is no divergence between the two wave trains.

Further, when the transmitter and the receiver are separate, it is difficult if not impossible to keep them both tuned to the same frequency and to the frequency of the driver, owing to changing temperature and pressure conditions to which the diaphragms of the two parts are subjected. It is a simple matter to keep the transceiver of this invention tuned to the frequency of the driver, and thus insure it operating at maximum efficiency at all times.

In general, the frequency of the signals employed for sound ranging is between five hundred and one thousand cycles per second, and because of the large inductances and capacities required for these frequencies, it is not practical to energize the transmitter from power tubes and therefore take advantage of the ease of tuning and stability that such a source of power affords. The driver is usually operated by a motor generator set driven from the ship's voltage, which varies with the load on the system, and it is almost impossible to maintain the frequency constant. The present invention uses high frequency sound waves and consequently may be driven by a power tube.

The low frequency heretofore employed for the sound signals makes it difficult, and indeed wellnigh impossible, to generate the short, sharp and clear-cut type of signal required for shoal depth-finding. This is due to the relatively long time required for the transmitter to build up to its full vibration amplitude and to die down again. In the most efficient design of tuned transmitter several oscillations are necessary for its amplitude to build up or to die out, no matter what its resonant frequency may be. The time required for this number of oscillations, however, varies inversely with the frequency and as a result the time elapsing in building up the signal intensity of a 500-cycle transmitter is about one hundred times that required for building up a 50-kilocycle transmitter, and as a result it is possible to reduce the length of a signal from the latter to about one per cent of the minimum length for a 500-cycle signal.

Another advantage of the high frequency signal is that it is highly directional, the wave train being in the nature of a beam projected vertically from the radiating surface. The receiver tuned for high frequencies is also directional and is consequently relatively insensitive to sound waves from any direction other than directly up from the sea bottom, which eliminates interference with the receiver by sound waves from other sources, such as those due to the slapping of waves against the hull of the vessel, the ship's propeller, etc., whereas the non-directive low frequency receivers are strongly affected thereby.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

Having thus described my invention, what I claim is:

1. A sound-ranging apparatus, comprising a vacuum tube having an anode, a grid, and a cathode; an anode circuit including two identical, like-sensed inductances in series with each other, a source of direct current in series with said inductances connected to impress a positive potential on said anode, periodically acting circuit interrupting means connected to the negative terminal of said source and to said cathode; a condenser connected to said grid, a coil disposed in inductive relation with the aforesaid inductances and connected to said condenser, a resistance connected to said grid and to the negative terminal of said source; a second pair of identical, like-sensed inductances connected in series and disposed with one in inductive relation with each of the said two inductances, a transceiver connected to one of said second inductances, a variable resistance connected to the other of the inductances of said pair, a condenser and an inductance connected in parallel with each other and in series with said resistance, a second condenser in series therewith and connected to said transceiver, a neutral branch connected between said second condenser and said pile and between the said inductances of said pair, a variable condenser connected to said neutral branch and in parallel with said pile, and a second variable condenser connected to said branch and in parallel with said first and second condensers, said resistance and said last mentioned inductance.

2. A sound-ranging apparatus, comprising a vacuum tube having an anode, a grid, and a cathode; an anode circuit including two identical, like-sensed inductances in series with each other, a source of direct current in series with said inductances connected to impress a positive potential on said anode; periodically acting circuit interrupting means connected to the negative terminal of said source and to said cathode; a condenser connected to said grid, a coil disposed in inductive relation with the aforesaid inductances and connected to said condenser, a resistance connected to said grid and to the negative terminal of said source; a second pair of identical, like-sensed inductances connected in series and disposed with one in inductive relation with each of the said two inductances, a transceiver connected to one of said second inductances, a variable resistance connected to the other of the inductances of said pair, a condenser and an inductance connected in parallel with each other and in series with said resistance, a second condenser in series therewith and connected to said transceiver, a neutral branch connected between said second condenser and said pile and between the said inductances of said pair, a variable condenser connected to said neutral branch and in parallel with said transceiver, and a second variable condenser connected to said branch and in parallel with said first and second condensers, said resistance and said last mentioned inductance.

3. In a device of the class described, a vacuum tube having an anode, a grid, and a cathode; an anode circuit including two identical, like-sensed inductances in series with each other, a source of direct current in series with said inductances connected to impress a positive potential on said anode, a circuit interrupting device connected to the negative terminal of said source and to said cathode; a condenser connected to said grid, a coil disposed in inductive relation with the aforesaid inductances and connected to said condenser, a resistance connected to said grid and to the negative terminal of said source; a second pair of identical, like-sensed inductances connected in series and disposed with one in inductive relation with each of the said two inductances, a transceiver connected to one of the inductances of said pair, a variable resistance connected to the other of the inductances of said pair, a condenser and an inductance connected in parallel with each other and in series with said resistance, a second condenser in series therewith and connected to said pile, a neutral branch connected between said second condenser and said pile and between the inductances of said pair and including output terminals, a variable condenser connected to said neutral branch and in parallel with said pile, and a second variable condenser connected to said neutral branch and in parallel with said first and second condensers, said resistance, and said last mentioned inductance.

4. In a device of the class described, a vacuum tube having an anode, a grid, and a cathode; an anode circuit including two identical, like-sensed inductances in series with each other, a source of direct current in series with said inductances connected to impress a positive potential on said anode, a circuit interrupting device connected to the negative terminal of said source and to said cathode; a condenser connected to said grid, a coil disposed in inductive relation with the aforesaid inductances and connected to said condenser, a resistance connected to said grid and to the negative terminal of said source; a second pair of identical, like-sensed inductances connected in series and disposed with one in inductive relation with each of the said two inductances, a transmitting unit connected to one of the inductances of said pair, a variable resistance connected to the other of the inductances of said pair, a condenser and an inductance connected in parallel with each other and in series with said resistance, a second condenser in series therewith and connected to said transceiver, a neutral branch connected between said second condenser and said unit and between the inductances of said pair and including output terminals, a variable condenser connected to said neutral branch and in parallel with said transceiver, and a second variable condenser connected to said neutral branch and in parallel with said first and second condensers, said resistance, and said last mentioned inductance.

5. In a device of the class described, an electro-generating receiving unit comprising a case, a resilient closure for an end thereof adapted to serve as a diaphragm, a pile of piezo-electric crystals mounted thereon, with like electrodes of adjacent crystals in contact, an inertia member over said pile, a closure for said case over said member consisting of a laterally expansible member and means to expand said member clamped thereagainst, a wire connected to all the positive electrodes of said pile, and a second wire connected to all the negative electrodes of said pile.

HARVEY C. HAYES.

REFERENCES CITED

The following references are of record in the file of this patent:

UNITED STATES PATENTS

| Number | Name | Date |
|---|---|---|
| 1,076,312 | Pfund | Oct. 21, 1913 |
| 1,691,719 | Jenkins | Nov. 13, 1928 |
| 1,858,931 | Langevin et al. | May 17, 1932 |
| 1,972,889 | Hayes | Sept. 11, 1934 |
| 2,098,266 | Walker | Nov. 9, 1937 |
| 2,025,041 | Colton et al. | Dec. 24, 1935 |
| 2,248,870 | Langevin | July 8, 1941 |
| 942,897 | Garrett et al. | Dec. 14, 1909 |
| 1,632,331 | Hayes | June 14, 1927 |

FOREIGN PATENTS

| Number | Country | Date |
|---|---|---|
| 174,354 | Great Britain | July 19, 1923 |
| 145,691 | Great Britain | July 28, 1921 |